April 3, 1934.　　　　L. MARTINAGE　　　　1,953,563
VEHICLE
Filed July 6, 1931　　　　2 Sheets-Sheet 1
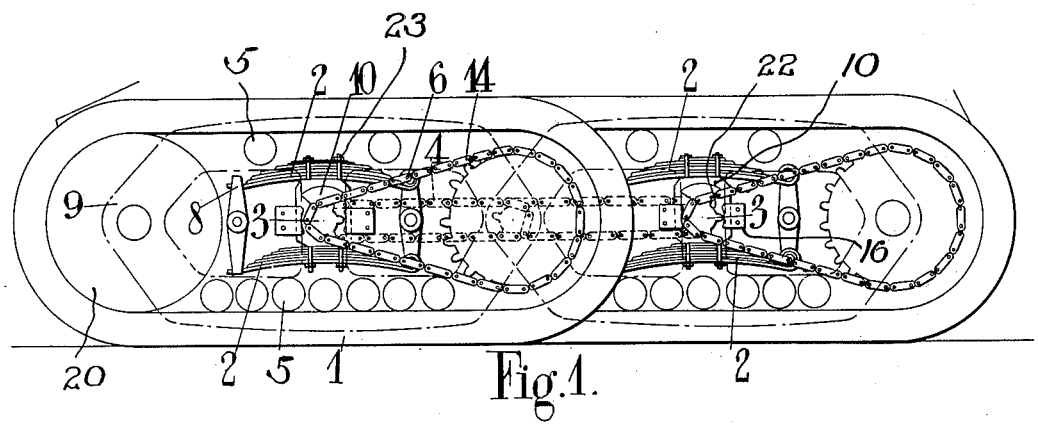
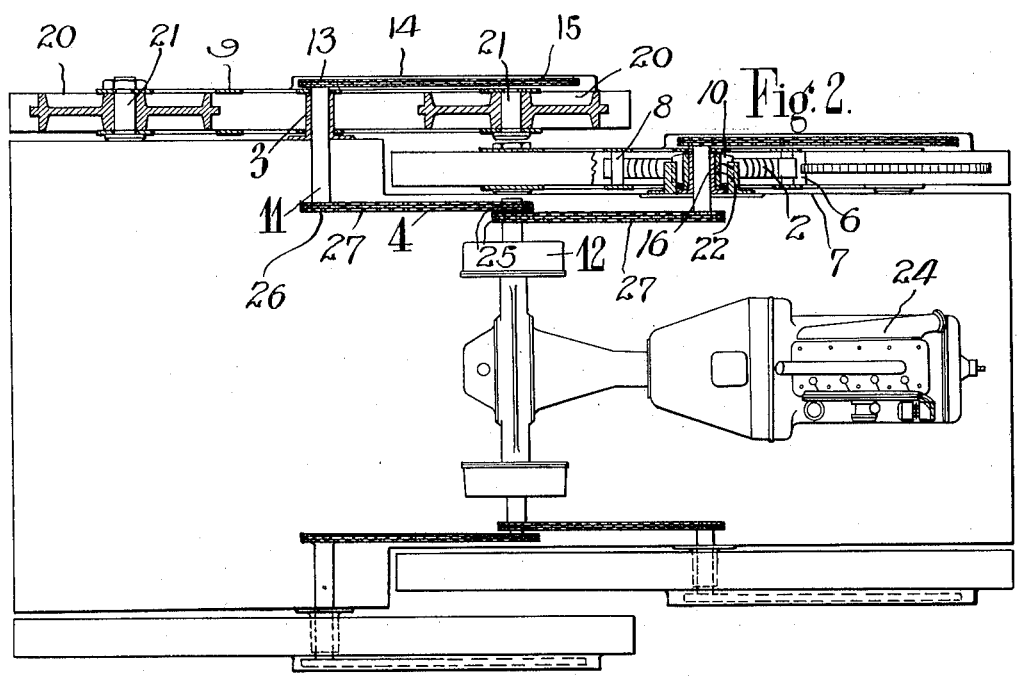

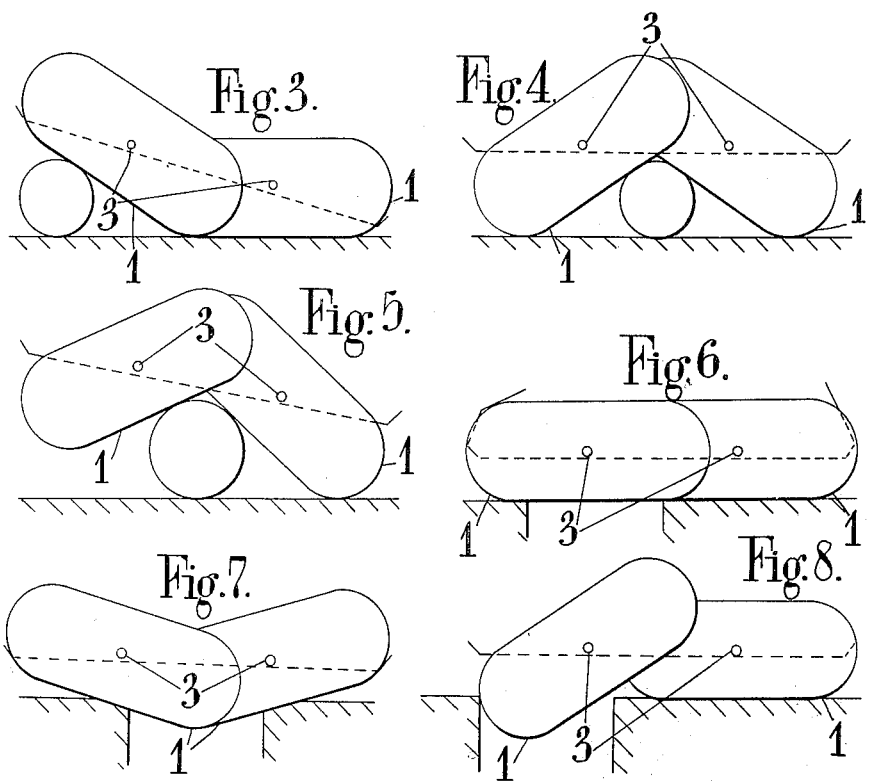

Patented Apr. 3, 1934

1,953,563

UNITED STATES PATENT OFFICE 1,953,563

VEHICLE

Léon Martinage, Paris, France

Application July 6, 1931, Serial No. 549,038
In France October 20, 1930

3 Claims. (Cl. 180—9.1)

This invention relates to endless track vehicles and has for its object to devise improvements in the construction and arrangement of such vehicles which will enable them easily to negotiate small obstacles (of which a tree trunk may be taken as a type) that may lie in their path.

The invention consists in a vehicle fitted with four independent endless tracks each of which is connected to the vehicle body by a substantially central pivot which permits each track to oscillate about the latter within limits imposed by stops. Further, the pivots of the tracks are placed at such a distance that the two tracks on the same side overlap one another.

Such an arrangement renders it possible to adapt endless tracks of the rigid chain type, with their advantages (replacement of broken ground by a track with a uniform and continuous surface, no excess tension of the chains on passing obstacles, greater speed possible), at the same time ensuring good stability in travel, and enabling the vehicle to clear larger obstacles than could be cleared with a vehicle with two tracks without the vehicle being caused at a certain moment to rock over the obstacle, which manœuvre in this case is difficult, requires a very good driver, imposes very heavy loads on the pivots of the tracks, and fatigues the material on account of the shocks as it falls back on to the ground.

The four tracks mentioned above, whether driven or not, each comprise:—

An endless track;
A suspension;
A central pivot;
Optionally a device enabling the motive power to be transmitted to the chain.

In the accompanying drawings,

Figures 1 and 2 are respectively an elevation and plan of one arrangement in accordance with the invention, and Figures 3 to 8 are diagrams illustrating the operation.

In the example illustrated an endless track comprises a chain 1 which passes over sprocket wheels 20 mounted by pivots 21 on frames 9 and is supported between these sprockets by bearer rollers 5 pivotally mounted on the said frames 9. The chain is preferably of the kind described in my copending application No. 545,338, such a chain being so constructed that in combination with suitably disposed bearer rollers, it presents a "rigid" track surface to the ground, that is to say, one which is incapable of upward deflection by irregularities in the latter.

The frames 9 are pivotally and resiliently mounted on the body 7 of the vehicle through the medium of axles 3 secured to the body 7, housings 22 rotatably mounted upon the axles and laminated springs 2 disposed above and below the said housings and attached thereto by bolts 23. One end of each of one of the said springs is pivotally connected at 6 to a frame 9 while the other end is free to slide in a shackle 8 secured to the said frame so as to permit of the movement of this end relatively to the frame which takes place when the spring is deflected. The housings 22 are provided with stop portions 10 adapted to engage fixed stops 16 secured to the body of the vehicle, the arrangement being such as will limit the extent to which the frames may move angularly relatively to the body of the vehicle.

Power is transmitted to the tracks 1 from a motor 24 through the medium of gear boxes 12, chain wheels 25 and 26 and chains 27 and driving shafts 11 to which the said chain wheels 26 are secured. The shafts 11 pass rotatably through the axles 3 and are provided with other chain wheels 13 which communicate by means of chains 14 with chain wheels 15 which latter chain wheels are adapted to drive the sprocket wheels 20.

The functioning of the rolling train comprising four tracks constructed as set forth above and each connected to the axle of the vehicle by a central pivot, is as follows (see Figures 3, 4, 5, 6, 7 and 8) :—

At the moment of attacking a short obstacle (Figure 3) the front track alone rises, the rear track continues to push the vehicle throughout its supporting surface, the adhesion of which is further augumented by the fact that it is supporting the greater part of the weight of the vehicle. This obviates the disadvantages presented by a rolling train with two tracks which, when placed in this position, will have its adhesion to the ground limited on account of the small amount of track surface in contact with the ground at the rear.

In the device to which this invention relates, when the rear track rises (Fig. 4) in its turn, the front track will already be on the obstacle and will be able to effect the traction by itself if adhesion to the ground is lacking at the rear.

The stop 10 serves to prevent the front track from rearing excessively if it encounters a very high obstacle.

The raising of the rear end of the front track (Fig. 5) occurs from the moment when the pivot is far enough advanced to allow it to oscillate.

Figure 4 shows the front track clearing the obstacle, and the rear track rising thereon. At this moment the body of the vehicle has been raised above the obstacle. The under part of the body is only a short distance from the obstacle, but cannot touch it, since by the action of the stops 10 the point of intersection of the lower portions of the two rolling bands will never reach the plane of the underside of the vehicle.

It may be observed that the distance from the body to the obstacle would be greater in the case of a vehicle mounted upon two trucks only. In my device, the body of the vehicle rises much less above the ground than in similar devices heretofore in use, and the expenditure of energy is less.

The diagram, drawn to a scale of 1/20, shows that with a free passage of 0.30 metre under the tracks, it is possible to clear a tree trunk having a diameter of 0.55 metre by raising the body 0.60 metre only, and without more than two of the tracks having simultaneously left the ground, and therefore without the body of the vehicle tipping excessively over.

If the obstacle were higher (see Figure 5) there would still be no excessive tilting of the body, for the driving train would still have four points of contact one for each track on the obstacle, and the respective tracks would simply follow its contour and descend on the other side.

Figure 6 shows a vehicle in accordance with the invention crossing a trench. Seeing that it is in point of fact recognized that a vehicle can only clear a trench which is less in size than half the bearing length of its tracks upon the ground, the half of this length is one entire track in the case under consideration.

In the event of or in consequence of the ground crumbling during the clearing of a trench the latter would increase in breadth (see Figure 7), the stops on the tracks would prevent them from pivoting, so that the body would never bear upon the ground. For a given width of trench the length of each track might be shorter than with a two-track vehicle and they would have much less tendency to become dislocated during their passage over the trench.

At the moment of reaching a ditch (see Figure 8) the front track would be able to tilt forward. In order to obviate this disadvantage it is a simple matter to displace the centre of gravity of the tracks towards the centre of the vehicle, or to provide an opposing spring. Even if the front tracks remained lowered, since in this position they would not be supporting the vehicle, and since, being themselves motor-driven tracks, they would continue to revolve, as soon as the front studs touched the opposite edge of the trench the front shoes would be immediately straightened.

Having now described my invention, what I claim as new and desire to secure by Letters Patent is:—

1. A vehicle comprising a body, endless tracks arranged in pairs on both sides of the body, separate frames, one for each track, members carried by the body and pivotally connecting each frame with the body and each track with the body, the pivotal connection being disposed approximately in the centers of the tracks and the tracks on the same side of the body overlapping each other.

2. A vehicle as claimed in claim 1, wherein a spring is provided between each frame and track and its pivot for taking up jolts between the track and body.

3. A vehicle comprising a body, two pairs of frames pivotally connected with the body, one pivot in advance of the other on both sides of the body, the frames of each pair overlapping each other on opposite sides of the body, an endless track movable below each frame, and means at the pivotal connection between the body and frames to limit the pivotal movement of the frames, and thus the tracks.

LÉON MARTINAGE.